Sept. 27, 1932. W. A. INGALSBE 1,879,270
HOG RINGER
Filed July 11, 1931 3 Sheets-Sheet 1

Inventor
Wm Adna Ingalsbe
By Clarence A. O'Brien
Attorney

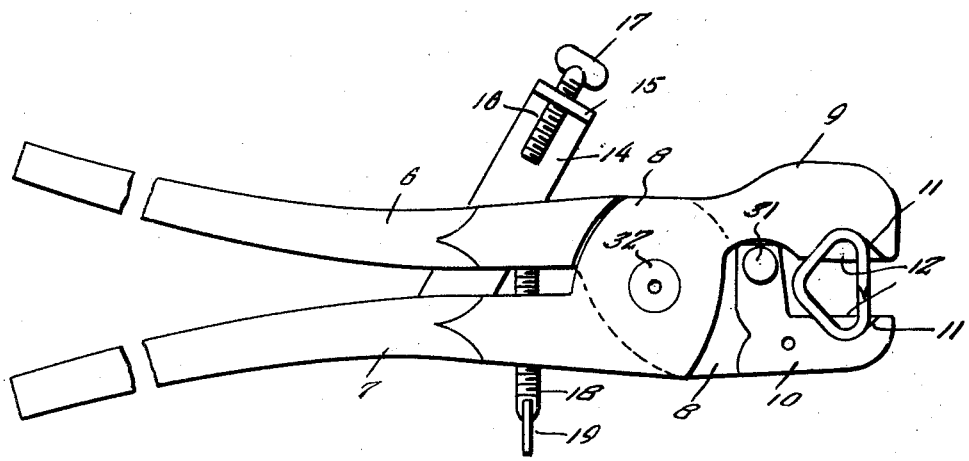
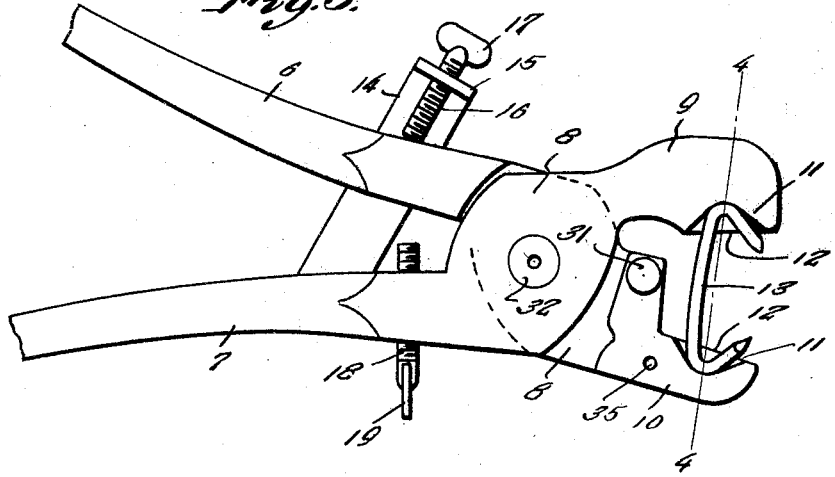
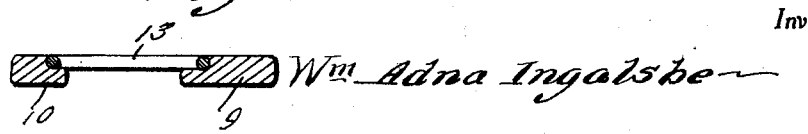

Sept. 27, 1932.  W. A. INGALSBE  1,879,270
HOG RINGER
Filed July 11, 1931  3 Sheets-Sheet 3

Inventor
Wm Adna Ingalsbe

By Clarence A O'Brien
Attorney

Patented Sept. 27, 1932

1,879,270

UNITED STATES PATENT OFFICE

WILLIAM ADNA INGALSBE, OF FITHIAN, ILLINOIS

HOG RINGER

Application filed July 11, 1931. Serial No. 550,259.

This invention appertains to new and useful improvements in implements for placing rings thru the noses of hogs and like animals.

The principal object of this invention is to provide a hog ringing implement wherein a magazine is provided for containing a multiplicity of rings.

Another important object of the invention is to provide a magazine hog ringer which is easy to operate and capable of saving considerable time when ringing a number of animals.

These and other important objects and advantages of the invention will become apparent to the reader of the following specifications and claims.

In the drawings:—

Fig. 2 represents a top plan view of the implement with a ring clinched between the doors thereof.

Fig. 3 represents a top plan view of the implement showing the ring before it has been clinched.

Fig. 4 represents a sectional view taken substantially on the line 4—4 of Fig. 3.

Figure 1:
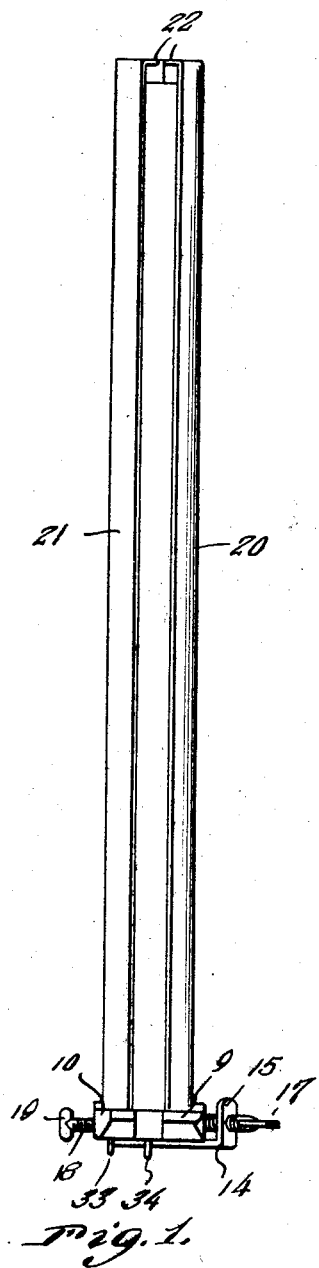
Figure 1 represents a front elevational view of the novel implement.

Referring to the drawings wherein like numerals designate like parts, it can be seen that numerals 6 and 7 represent handles curved outwardly toward their free ends and provided at their remaining ends with inwardly disposed portions 8. One of the offset portions 8 is provided with the jaw 9 while the other offset portion is provided with a jaw 10.

Each of these jaws 9 and 10 is provided with a notch 11 for defining a ledge 12 on a corresponding door for receiving the ring blank 13 in the manner shown in Fig. 3, before the handles 6—7 are contracted clinching the ring blank through the animal's nose. The blank is of general U-shape with the bight portion thereof slightly curved outwardly and the leg portions disposed obliquely inwardly, so that when the jaws 9 and 10 are brought together, the blank will be bent to the substantially triangular shape as shown in Fig. 2.

An arm 14 extends laterally from the handle 7 under the handle 6 and beyond the same, and is provided with an upstanding flange 15 through which the screw 16 is feedable. The outer end of this screw is provided with a wing 17 and by feeding this screw 16 inwardly or outwardly, the freedom of movement of the handle 6 can be regulated. A screw 18 with a wing 19 on the outer end thereof is seatable through the handle 7 to act as an abutment for the handle 6, so as to limit the closing extent of the jaws 9 and 10.

Figure 8:
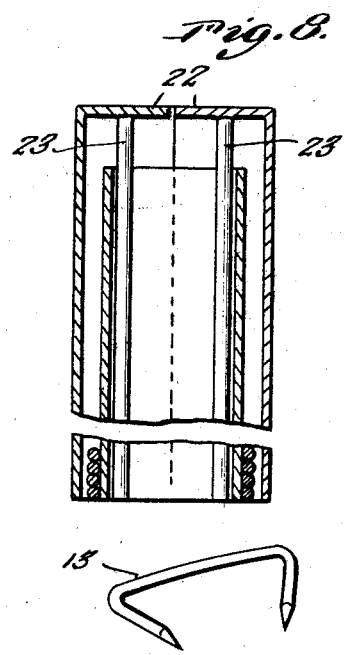
Fig. 8 represents a fragmentary vertical sectional view through the magazine.
Figure 9:
Fig. 9 represents a perspective view thru one of the ring members.
Figure 10:
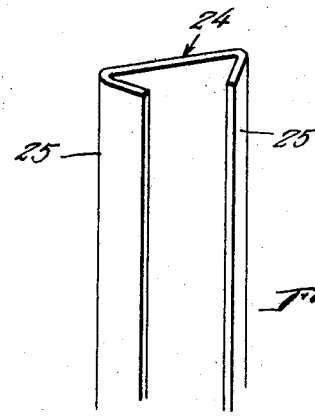
Fig. 10 represents a fragmentary perspective view of the carrier for the rings.
Figure 5:
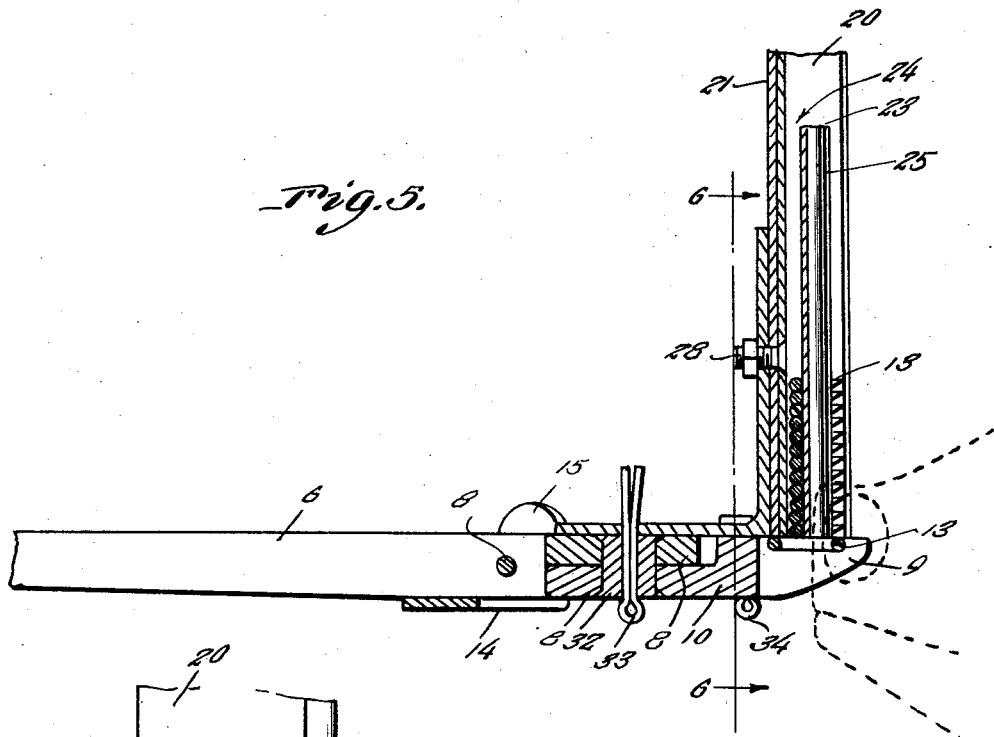
Fig. 5 represents a fragmentary longitudinal sectional view through the implement.
Figure 6:
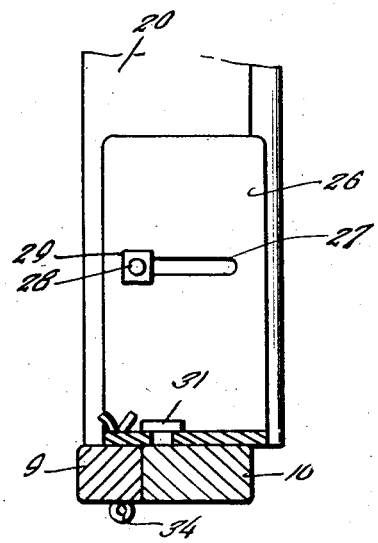
Fig. 6 represents a vertical sectional view taken substantially on the line 6—6 of Fig. 5.
Figure 7:
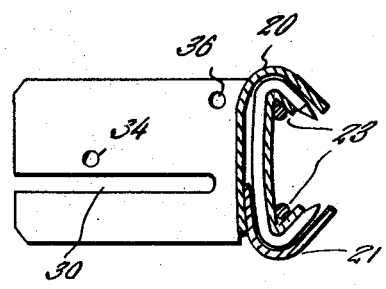
Fig. 7 represents a horizontal sectional view through the magazine.

Fig. 1 clearly shows the magazine which is constructed of a pair of elongated sections 20 and 21. These sections 20 and 21 are suitably secured together so as to provide a barrel provided with flanges 22 at the upper end thereof. Depending from these flanges 22 are the supporting rods 23—23 for supporting the carrier generally referred to by numeral 24 for the brake line 13. This carrier consists of an elongated metallic guide plate with the edge portions thereof bent inwardly to provide lips 25—25 converging toward each other to engage against the rods 23—23 in the manner substantially shown in Fig. 7. The ring blocks 13 are stacked against the carrier 24 in the manner substantially shown in Figs. 5, 7 and 8.

At the lower end of the magazine is an L-shaped plate 26, provided with a transversely extending slot 27 in the upper portion thereof. Through this slot 27 extends the bolt 28 protruding from the section 20 of the magazine. This bolt 28 is provided with a nut 29, whereby the magazine sections can be adjusted to the desired extent with respect to the guide plate.

The lower horizontal portion of the plate 26 is provided with a slot 30 extending inwardly from the lower end of the plate, and this is to receive the headed stud 31 on the jaw 10. Numeral 32 represents the pivot bushing which is formed to provide an opening for the reception of a cotter key 33 which also extends through the opening 34 in the lower portion of the plate 26 which along with the cotter key 34 extending through the opening 35 in the jaw 10 and through the opening 36 in the lower portion of the plate 26, serves to secure this plate 26 at its lower portion to the pliers type clinched.

It can now be seen, that when the magazine is properly adjusted over the jaws of the implement, there will always be one of the blanks 13 resting upon the aforementioned ledges 12—12 of the jaws 9 and 10 respectively.

By expanding the handles 6 and 7 after the jaws 9 and 10 have been placed on opposite sides of an animal's nose, the blank 13 will be contracted, so that its pointed ends will penetrate through the nose of the animal and assume the shape shown clearly in Fig. 2.

Obviously by opening the jaws, that is by spreading the handles apart, the ring in its contracted form immediately passes between the jaws, and as soon as this formed ring is displaced, another blank will fall onto the ledges 12—12 and be ready for the next operation.

While the foregoing specification sets forth the invention in specific terms, it is to be understood that numerous changes in the shape, size and materials may be resorted to without departing from the spirit and scope of the invention as claimed hereinafter.

Having thus described my invention, what I claim as new is:—

1. A ringing tool comprising a pliers implement including a pair of jaws, each of said jaws being provided with a blank supporting ledge across which a ring blank can bridge when the jaws are expanded, an arm projecting laterally from one of the handles of the pliers and under the complimentary handle, said arm being provided at its free end with a flange having a threaded opening, and a set screw disposed through the threaded opening to afford an abutment for the last-mentioned pliers handle.

2. A magazine for ringing tools comprising a shell constructed in a pair of sections, a guide vertically disposed in the shell and around which ring blanks can be arranged in stacked position, and a pin and slot connection between the sections of the shells whereby the shells can be expanded or contracted to accommodate various sized blanks.

In testimony whereof I affix my signature.

WILLIAM ADNA INGALSBE.